Jan. 11, 1966  L. G. ARNOLD ETAL  3,228,484
SEMIMOUNTED PLOW

Filed July 8, 1963  5 Sheets-Sheet 1

FIG. I

INVENTORS.
LOREN G. ARNOLD
ANTHONY S. TRAPKUS
BY

ATTORNEY

Jan. 11, 1966     L. G. ARNOLD ETAL     3,228,484
SEMIMOUNTED PLOW

Filed July 8, 1963     5 Sheets-Sheet 2

INVENTORS.
LOREN G. ARNOLD
ANTHONY S. TRAPKUS
BY
*John C. Thompson*
ATTORNEY

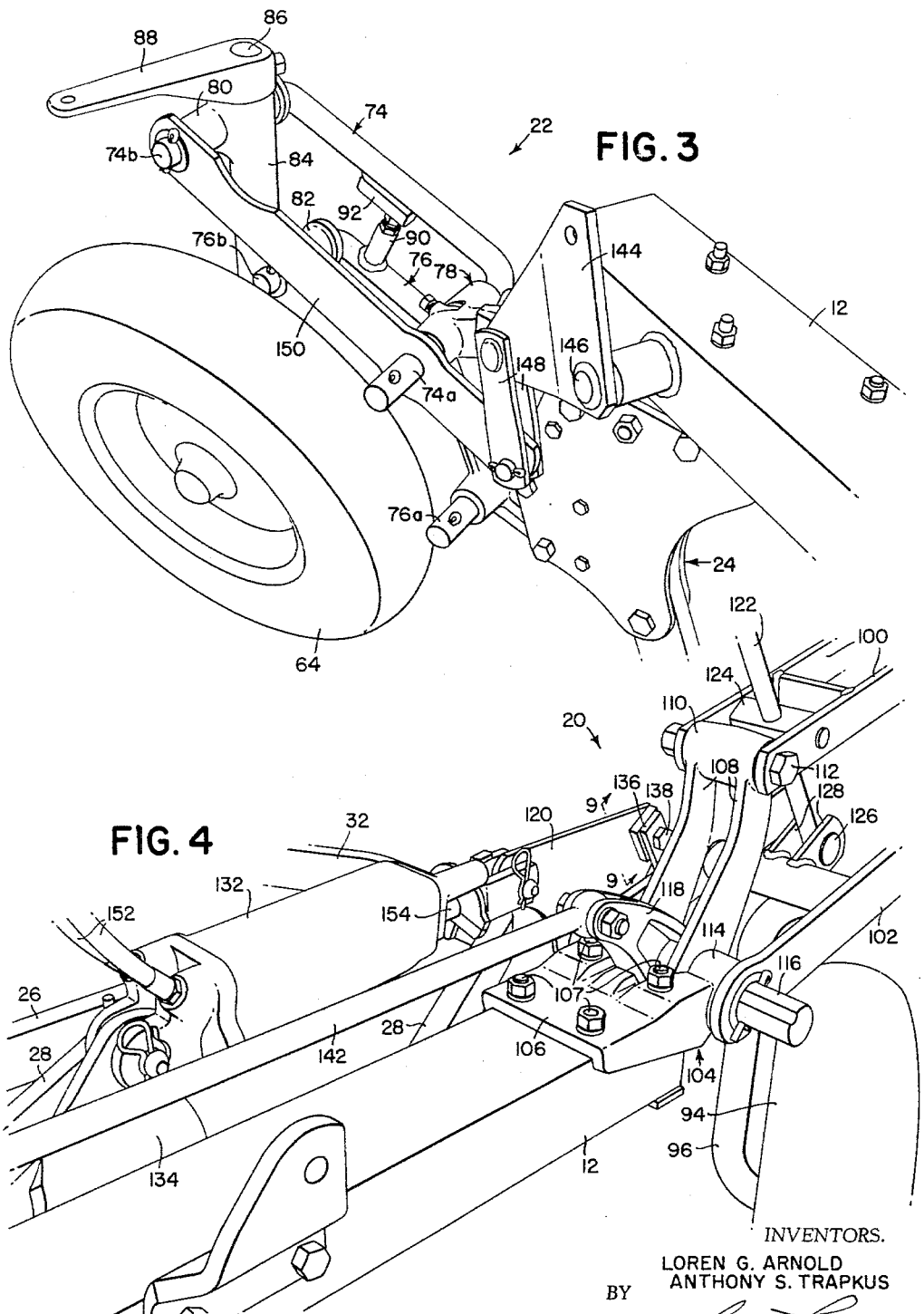

INVENTORS.
LOREN G. ARNOLD
ANTHONY S. TRAPKUS
BY

ATTORNEY

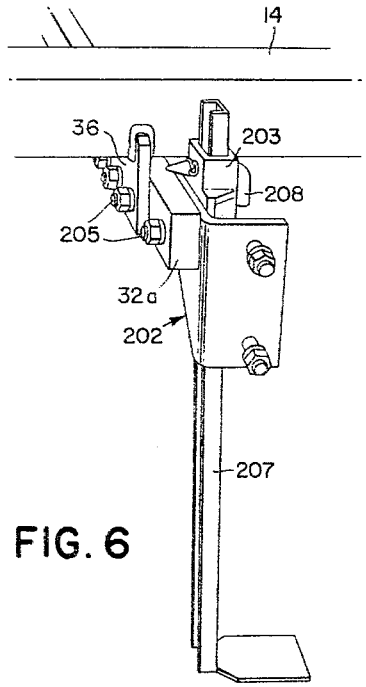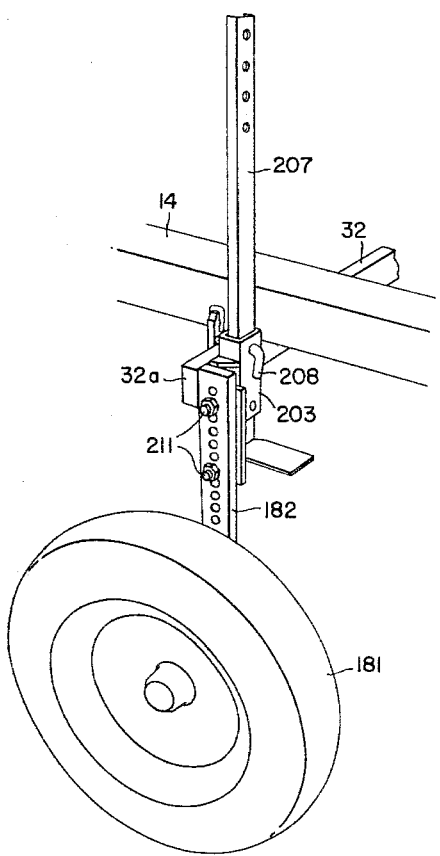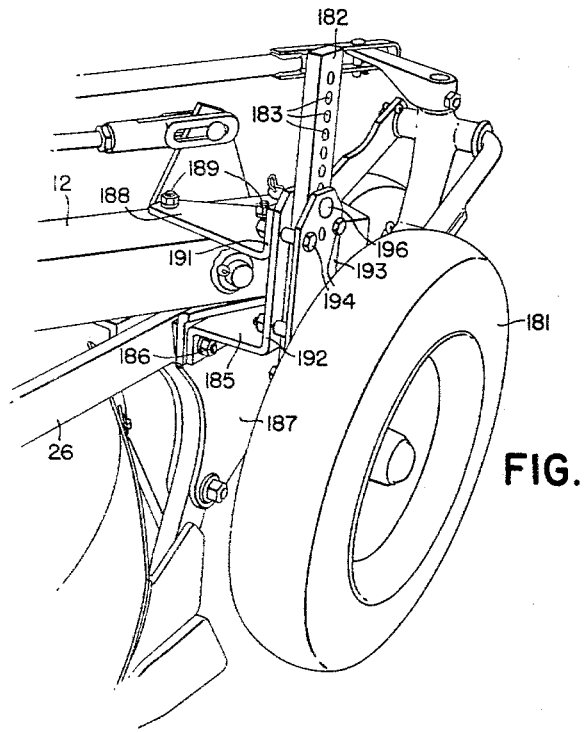

United States Patent Office

3,228,484
Patented Jan. 11, 1966

3,228,484
SEMIMOUNTED PLOW
Loren G. Arnold, Rock Island, and Anthony S. Trapkus, Moline, Ill., assignors to Deere & Company, Moline, Ill., a corporation of Delaware
Filed July 8, 1963, Ser. No. 293,414
8 Claims. (Cl. 172—400)

The present invention relates generally to agricultural implements, and more particularly to earth-working units, such as plows or the like, of the type that are adapted to have their forward ends connected to and carried by a farm tractor of the type having upper and lower hitch links, the rear end of the implement being supported by a steerable rear furrow wheel.

The object and general nature of this invention is to provide in an agricultural frame having a generally oblique main frame bar and a forwardly extending hitch bar rigidly secured to the main frame bar, means to support forward and rear ends of the main frame bar and independent means to support the forward end of the forwardly extending draft frame. More specifically, it is an object of the present invention to provide in an agricultural implement having three points of support independent means to raise and lower each corner of the implement.

Another object of this invention is to provide means to interconnect an agricultural implement of the type described to a tractor which will permit the tractor to roll and turn with respect to the agricultural implement without effecting the efficiency of the towed agricultural implement.

Another object of this invention is to provide novel means for raising and lowering the front and rear furrow wheels of a large semimounted plow.

Another object of this invention is to provide novel means for raising and lowering front and rear furrow wheels simultaneously.

Another object of this invention is to provide novel means for raising and lowering front and rear furrow wheels simultaneously.

Another object of this invention is to provide a novel gauge wheel and supporting structure which is also adapted to support the plow of this invention when it is being transported.

These and other objects and advantages of the present invention will be apparent to those skilled in the art, after a consideration of the following detailed description, taken in conjunction with the accompanying drawings, in which:

FIG. 3 is a perspective view of the rear furrow wheel.

FIG. 4 is a perspective view of a portion of the front furrow wheel and associated lift mechanism that is adapted to raise both front and rear furrow wheels simultaneously.

FIG. 6 is a view illustrating a supporting stand which may be secured to the first frame bar of the plow of this invention.

FIGS. 7 and 8 show two positions of the gauge wheel.

Figure 1:
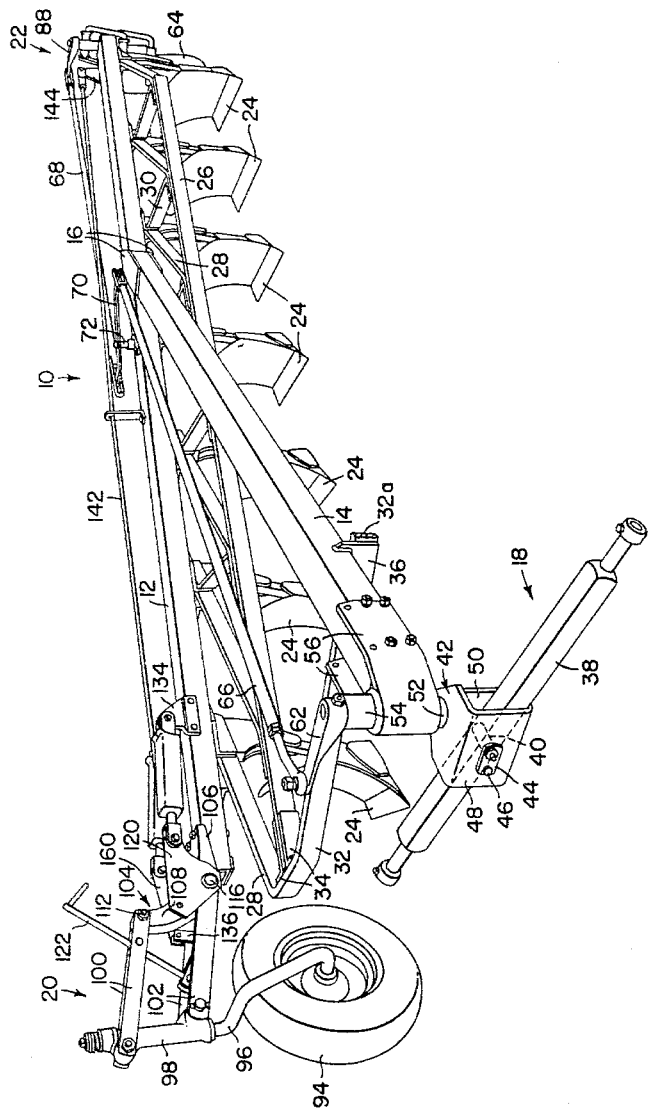
FIG. 1 is a perspective view of a seven-bottom plow in which the principles of this invention have been incorporated.

Referring first to FIG. 1, a plow indicated generally at 10 is provided with a main frame bar 12 to which is secured at a generally intermediate point a forwardly extending draft beam 14. The forwardly extending draft beam 14 is rigidly secured to the main frame bar 12 by means of plates 16 which are rigidly bolted or otherwise secured to the bar 12 and beam 14. A hitch device, indicated generally at 18, is disposed at the forward end of the draft beam 14, and front and rear furrow wheel assemblies, indicated generally at 20 and 22 respectively, are disposed at front and rear ends of the main frame bar 12. Secured to the bottom side of the main frame bar 12 are the plow bottom assemblies 24 which are of generally conventional construction. A truss bar 26 is secured generally forwardly of the main frame bar 12 by means of frame bars 28 and braces 30. The first frame bar 28 is provided with a transversely extending portion 32 which is secured at one end to the truss bar 26 by means of truss bar supports 34, and is secured at its other end to a bracket 36 which is in turn welded to the forwardly extending draft frame 14. Coulters may be secured, if desired, forwardly of the various plow bottom assemblies on the frame bars 28.

In order to provide for rolling or lateral tilting of the tractor with respect to the plow, the hitch device 18 includes a generally transversely extending crossbar 38 which is journalled about a generally fore-and-aft extending pin 40 that is disposed within housing 42. The pin 40 is secured to the housing 42 by means of a plate 44 which is rigidly secured to the forward portion of the pin 40 and a cap screw 46 which secures the plate 44 to the front wall 48 of the housing 42. The rear portion of the pin is disposed within an aperture in the back wall 50 of the housing 42. Rigidly secured to a rearward portion of the housing 42 is an upwardly extending shaft 52. An upper portion of the shaft 52 is disposed within a hitch bearing 54 that is secured to the bight portion of a generally U-shaped member 56. The U-shaped member 56 is secured, as by bolting, to the forward portion of the draft beam 14. The upper most portion of the shaft 52 is provided with a keyed portion that receives the steering arm 62. The steering arm is connected through appropriate linkage to the rear steerable furrow wheel 64 (FIG. 3). The steering linkage includes a front steering pipe 66, a rear steering pipe 68, and an intermediate arm 70. The arm 70 is connected with the main frame bar 12 by means of a pivot member 72.

The rear furrow wheel 64 is secured to the end of the main frame bar 12 by means of parallel links 74, 76 (FIG. 3). Each parallel link has generally transversely extending front and rear portions, the front transverse portions 74a and 76a being journaled for rotation within a casting 78. The rear transverse portions 74b and 76b are mounted for rotation within bearings 80 and 82 on casting 84. The casting 84 is provided with a vertically extending bore that receives a vertically extending shaft that terminates in a keyed portion 86. The lower end of the shaft is provided with a stub axle that receives the rear furrow wheel 64. Secured to the keyed portion 86 of the shaft is a steering arm 88 that is in turn pivotally secured to the rear steering pipe 68. The front casting 78 is secured to the rear end of the main frame bar 12 in any conventional manner, not illustrated. Rigidly secured to the parallel link 76 at an intermediate portion is an adjustable stop member 90 that is adapted to cooperate with stop plate 92 which is in turn rigidly secured to the parallel link 74.

The front furrow wheel 94 is secured to the forward end of the main frame bar 12 by means of an axle shaft 96. The vertically extending portion of the axle shaft 96 is journaled for castering movement within a casting 98. The rear ends of generally parallel links 100, 102 are mounted for pivotal movement on a support 104 which is in turn secured to the main frame bar 12. The support 104 includes a generally flat portion 106 which is secured by bolts 107 to the forward end of the main frame bar 12, two forwardly and upwardly extending arms 108 which terminate in a bushing 110 that receives a pivot bolt 112 to which the upper links 100 are secured. The lower portion of the support 104 is provided with bushings 114 to the outer sides of the arms 108, only one bushing being shown in the drawings. Disposed within the bushings 114 is a rockshaft 116 to which is fixed at an intermediate portion between the arms 108 an upstanding rock arm 118. Secured to the laterally inner end of the rockshaft 116 is a lift plate 120, as shown in FIG. 4.

The front furrow wheel assembly 20 includes an adjustable depth stop gauge comprising a depth adjusting rod 122. The rod 122 is provided with a fixed stop 123 (FIG. 5) which is adapted to abut below the pivoted stop block 124. The lower end of the rod 122 is threaded and is adapted to pass through the adjusting rod nut 126 which is journaled for rotation on ears 128. The ears are in turn welded to a rod 130 which is secured between the links 102.

According to one modification of this invention, a single hydraulic cylinder may be employed to raise and lower both the front and rear furrow wheels. As best shown in FIG. 4, a hydraulic cylinder 132 is pivotally secured at its forward end to the lift plate 120 and is similarly secured to bracket 134 which is in turn rigidly fixed to the main frame bar 12.

Figure 5:
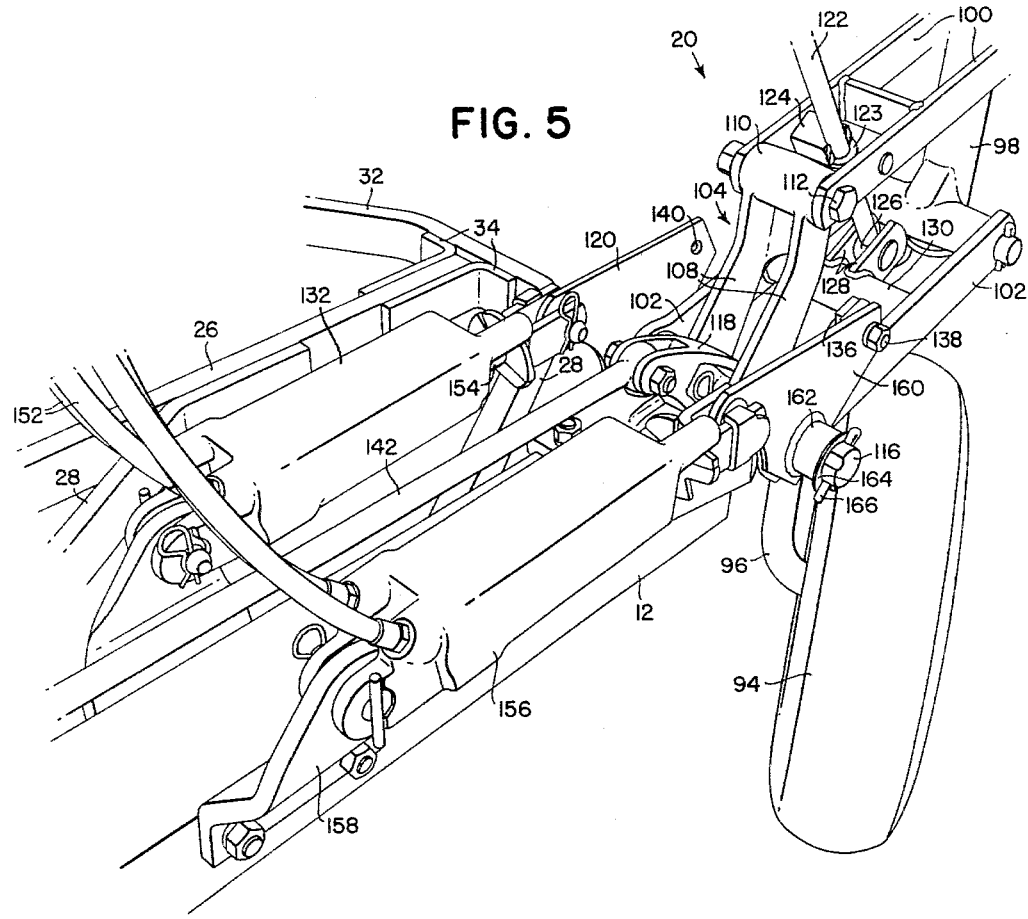
FIG. 5 is a perspective view similar to FIG. 4 in which independent means are employed to raise the front and rear furrow wheels respectively.
Figure 9:
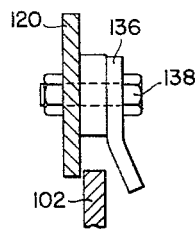
FIG. 9 is a fragmentary sectional view taken along the line 9—9 of FIG. 4.

A lug 136 is secured to the forward end of lift plate 120 by means of a bolt 138 which is adapted to pass through aperture 140 (FIG. 5). Fixing the lug 136 to the inside face of the plate 120 disposes the lug in a position to engage the adjacent link 102. A rearwardly extending lift rod 142 is pivotally secured at its forward end to the rock arm 118 and is secured at its rear end to lift plate 144 (FIGS. 1 and 3). The lift plate or bell crank 144 is pivotally secured to the rear end of the main frame bar 12 by means of an outwardly extending pivot 146. Secured to a lower rearward portion of the lift plate 144 are links 148 which are in turn pivotally secured to a lift arm 150. The lift arm is provided with an apertured rear portion which is mounted on the rear transverse portion 74b of the parallel link 74, and an apertured intermediate portion which is mounted on the front transverse portion 74a of the parallel link 74.

The operation of this embodiment is as follows: To raise the plow from its ground-working position shown in FIGS. 1 and 4 to a transport position, all that it is necessary to do is raise the cross bar 38 in a manner fully described below, and to introduce hydraulic fluid into the cylinder 132 through one of the fluid lines 152 from a source of fluid under pressure on the tractor T, which will in turn cause the piston rod 154 to be moved forwardly. Forward movement of the piston rod will in turn cause the lift plate 120, the rockshaft 116 and rock arm 118 to rotate in a forward direction. The front furrow wheel 94 is caused to move downwardly by engagement of the link 102 by lug 136 which will in turn cause links 100 and the other links 102 to rotate downwardly about their rearward pivots 112 and 116. This rotational movement of the links will cause the casting 98, axle shaft 96, and front furrow wheel 94 to be all forced downwardly thus raising the front end of the plow. At the same time the front end of the plow is being raised relative to the caster wheel 94, forward movement of the lift arm 118 will cause the rear lift plate 144 (FIG. 3) to be rotated in a forward direction about the pivot 146 through lift rod 142. The lift plate 144, which is in turn connected to the lift arm 150 through the links 148, will cause the parallel links 74 and 76 to rotate in a downward direction with respect to the casting 78, thus forcing the rear furrow wheel 64 and its associated structure downwardly. To lower the plow, it is only necessary to reverse the procedure outlined above, namely, lower the crossbar 38 and retract the piston rod 154.

In applicants' alternative embodiment the front and rear furrow wheels may be raised independently of each other. This operation is to be preferred for the reasons to be set forth in detail below. According to this preferred embodiment, a second hydraulic cylinder 156 (FIG. 5) is provided, which is attached at its rearward end to bracket 158 and at its forward end to the auxiliary lift plate 160. The lift plate 160 which is of generally the same configuration as the lift plate 120, is provided with a sleeve 162 which is integrally secured therewith, as by welding, the sleeve being adapted to freely rotate about the rockshaft 116. The lift plate 160 and its associated sleeve are held on the rockshaft 116 by means of a washer 164 and cotter pin 166. In this embodiment the lug 136 is secured to the forward end of lift plate 160 by means of the bolt 138, as shown in FIG. 5.

Figure 2:
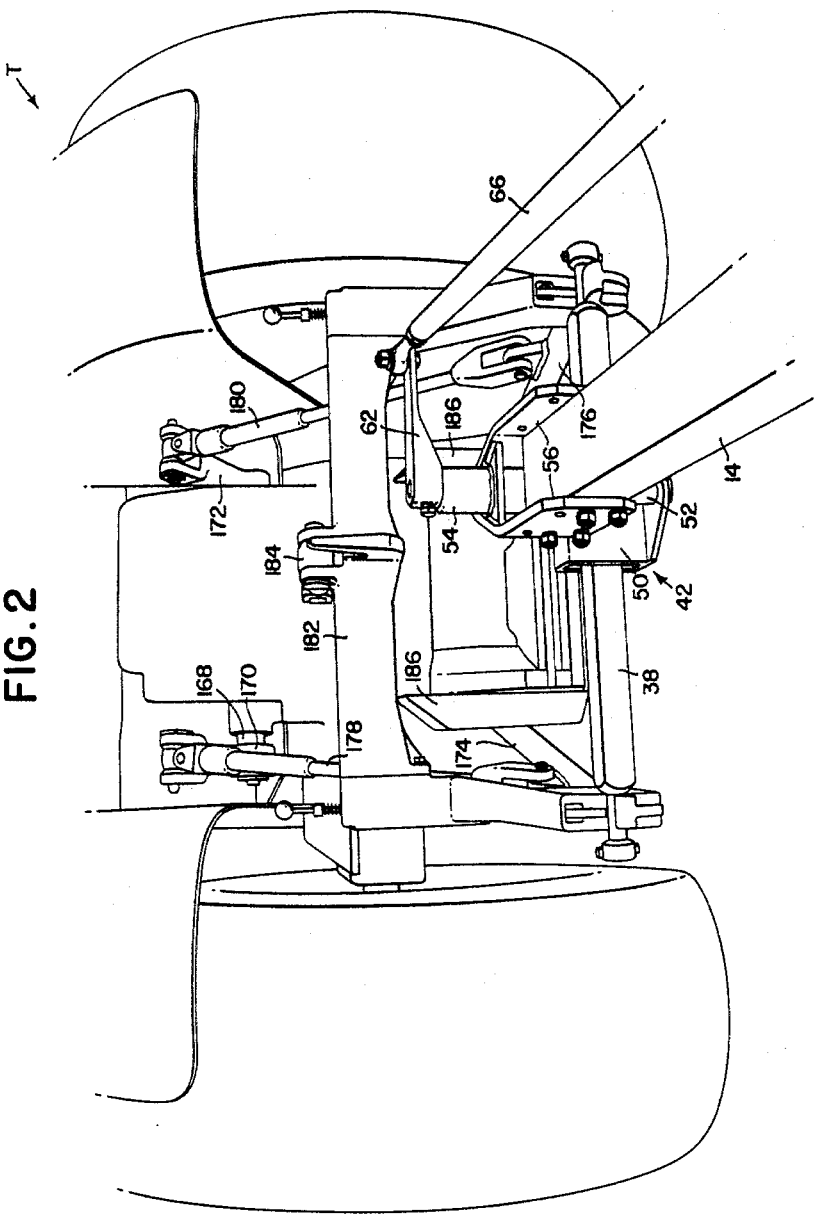
FIG. 2 is a rear view of a farm tractor to which the plow has been secured.

In operation, if the tractor T to which the plow 10 is secured, is provided with two remote hydraulic circuits it is desirable to first lower the front end of the plow by means of raising the front furrow wheel 94 and lowering the forward end of the draft frame 14 when entering the field and to subsequently raise the rear furrow wheel 64. Similarly, when leaving the field it is desirable to initially raise the front end of the plow, and subsequently to raise the rear end of the plow. To effect this operation, the tractor operator will simultaneously cause the front furrow wheel 94 to be moved downwardly by actuation of the hydraulic cylinder 156 and to correspondingly move the crossbar 38. More specifically, when entering a field the front crossbar 38 is caused to be lowered by rotation of the tractor rockshaft 168 (FIG. 2) which will cause the rearward portions of the rock arms 170, 172 to be swung downwardly, thus causing the draft links 174, 176 to be moved downwardly through means of the lift links 178, 180. The draft links 174, 176 may be connected directly to the crossbar 38, or as illustrated in FIG. 2, they may be connected to an implement coupler 182 which is in turn connected to the crossbar 38. The implement coupler is connected at its upper end to the tractor through means of a compression link 184. Simultaneously, as the crossbar is being caused to be moved in a downwardly direction by rotation of the rockshaft 168, the hydraulic cylinder 156 is actuated to retract its piston rod from an extended position (not shown) to a retracted position as shown in FIG. 5. As the cylinder 156 is retracted the links 102, 100 will rotate as the link 102 maintains engagement with the lug 136, this rotational movement being caused by the weight of the implement. As the cylinder 156 reaches its fully retracted position, the stop 123 on the depth adjusting rod 122 will engage the pivoted stop block 124 thus limiting further upward rotational movement of the links 100, 102 relative to the plow.

After the forward end of the plow has been lowered in the manner fully described above, the tractor operator will then cause the cylinder 132 to be retracted. The retraction of cylinder 132 will cause the rockshaft 116 and rock arm 118 to be moved in a rearward direction thus permitting the rear furrow wheel to move upwardly as the forward end of lift arm 150 is moved downwardly through rotational movement of the lift plate 144 and downward movement of the links 148.

The advantage of employing independent means to raise and lower the front and rear portions of a plow is that when employing a plow having a plurality of bottoms, such as that illustrated in this application, if the front and rear portions of the plows were raised and lowered simultaneously as leaving and entering a field respectively, a saw-tooth effect would be created at the headland of the field. By raising and lowering the front and rear ends of the plow independently of each other this saw-tooth effect may be virtually eliminated. This is due in part to the fact that it takes a few seconds for the hydraulic cylinders to be moved from their fully advanced position to their fully retracted position and vice versa.

In operation when it is desired to turn, movement of the tractor T with respect to the plow 10 will cause the crossbar 38, housing 42 and shaft 52 to rotate with respect to the plow, thus causing the steering arm 62 to move the rear wheel steering arm 88 through the steering linkage 66, 68, 70. Thus relatively sharp turns may be made with this plow. In order to prevent lateral swinging of the crossbar 38 with respect to the tractor T both during plowing and during turning, sway blocks 186 are employed to prevent any lateral swinging of the draft links 174, 176. These sway blocks are shown and claimed in U.S. Patent 2,987,126, issued June 6, 1961.

The plow of this invention is provided with a gauge wheel 181 which may be normally mounted on the rear end portion of the plow as shown in FIG. 7, but which may also be mounted on the forward portion of the draft beam 14 as shown in FIG. 8, in which position it will function to aid in shifting the plow about to different locations, in the dealers shop or implement lot, for example, when the implement is detached from the tractor, or when shifting the plow about for purposes of putting it in storage.

Referring first to FIG. 7, which shows the gauge wheel in its rear or gauging position, the gauge wheel 181 is shown as journaled on a spindle fixed to the lower end of a vertical axle bar 182 having its upper position formed with a plurality of openings 183. A bracket 185 is fixed at the lower side of the main frame bar 12 by the two bolts 186 that fix the plow trip standard 187 and the rear end of truss bar 26 to the frame bar 12. The bracket 185 is reinforced by an upper plate 188 that is fixed to the frame bar by bolts 189 that also fix the rear end of frame bar 12 to the associated plow standard 187. The plate 188 includes an upper flange 191 that is disposed against the upwardly extending section 192 of the bracket 185. A front plate 193 is clamped to the bracket section 192 by bolts 194 with the gauge wheel axle bar 182 therebetween. The latter is held in different vertical positions by a stop pin 196 which is insertible in selected openings 183. By taking out the stop pin 196 and raising or lowering the gauge wheel, and then reinserting the pin 196, the desired limit on depth of penetration is secured. Depth of penetration of the forward bottoms is controlled by the vertical position of the crossbar 38 with respect to the tractor T.

The transverse portion 32 of the first frame bar 28 is extended, as at 32a, past the draft beam 14 and the bracket 36 to provide means to receive a gauge wheel support 202 and a hollow stand-receiving clamp 203 that is fastened by a pair of bolts 205 that extend through apertures in the gauge wheel support 202, the outer end 32a of the frame bar portion 32 and the bracket 36. A stand 207 (FIGS. 6 and 8) is vertically adjustable in the clamp 203 and is held in different selected vertical positions by a locking pin 208.

When it is desired to move the plow when not attached to a tractor, such as when loading or unloading the plow onto or from a truck, or when manually shifting the plow about an implement lot or in a storage area, the lift cylinders 132 and 156 are removed and a conventional screw jack (not illustrated) is connected between the left-hand cylinder support 134 (FIG. 4) and the left-hand lift plate 120, the stop 136 having been removed from the right-hand lift plate 160 (FIG. 5) and installed on the left-hand lift plate 120 so as to engage the left-hand link 102. Thus, when the screw jack is actuated, the plow is raised and lowered relative to the front and rear wheels 94 and 64. Before the tractor T is disconnected, the tractor power lift is actuated so as to raise the front end of the draft beam 14 and then the gauge wheel 181 and axle bar 182 are moved forward and fixed to the support 202 by bolts 211. After the plow is lowered onto the gauge wheel the tractor may be disconnected from the plow and driven away. The stand 207 may then be raised to a transport position (FIG. 8).

While we have shown and described the preferred structure in which the principles of the present invention have been incorporated, it is to be understood that our invention is not to be limited to the particular details, shown and described above, but that, in fact, widely different means may be employed in the practice of the broader aspects of our invention.

We claim:

1. In an agricultural implement, a main frame bar extending obliquely to the direction in which the implement is adapted to be pulled, a plurality of depending earth-working tools mounted on said main frame bar, a forwardly extending hitch bar nonrotatably attached to the main frame bar, means carried by said hitch bar adapted to be secured to a tractor, and means mounting forward and rear furrow wheels on forward and rear portions of the main frame bar, respectively, for generally vertical movement, a rockshaft journaled on the main frame bar, a rock arm secured to a central portion of said rockshaft, a first member nonrotatably secured to one end of said rockshaft, a second member journaled about the other end of said rockshaft, first and second extensible and retractable means, each having one of their ends secured to the first and second members respectively, the other ends of said extensible and retractable means being secured to the main frame bar, and means interconnecting said rock arm and said second member with said rear and forward furrow wheel mounting means respectively, whereby movement of either said second member or said rock arm will cause the associated furrow wheel to be moved vertically.

2. The invention set forth in claim 1 further characterized by said front furrow wheel being mounted, on the forward portion of the main frame by generally parallel links, and said means interconnecting the member that is journaled about the rockshaft with the front furrow wheel comprising a stop on said member engageable with one of said links.

3. The invention set forth in claim 1 further characterized by said means interconnecting said rock arm and said rear furrow wheel comprising, a rearwardly extending link connected to said rockshaft, a fixture pivoted on a rear portion of said main frame bar, said fixture having a portion secured to said rearwardly extending link, and means interconnecting said fixture with said rear furrow wheel whereby movement of said first extensible and retractable means will cause the rear furrow wheel to be moved vertically.

4. The invention set forth in claim 2 further characterized by said means interconnecting said rock arm and said rear furrow wheel comprising, a rearwardly extending link connected to said rockshaft, a fixture pivoted on a rear portion of said main frame bar, said fixture having a portion secured to said rearwardly extending link, and means interconnecting said fixture with said rear furrow wheel whereby movement of said first extensible and retractable means will cause the rear furrow wheel to be moved vertically.

5. In an agricultural implement, a main frame bar extending obliquely to the direction in which the implement is adapted to be pulled, a plurality of depending earth-working tools mounted on said main frame bar, a forwardly extending hitch bar non-rotatably secured to the main frame bar, a crossbeam, means for connecting a midportion of said crossbeam in fixed spaced relation to the forward end of said hitch bar whereby the crossbeam may rotate about a generally vertically extending axis and a generally fore-and-aft extending axis, a forward furrow wheel mounted on the forward portion of the main frame bar, a steerable rear furrow wheel mounted on a rear portion of the main frame bar, each of said furrow wheels being mounted for generally vertical movement, means interconnecting said crossbeam and said rear furrow wheel whereby turning of said crossbeam about said vertical axis will cause the rear furrow wheel to be turned, a rockshaft journaled on said main frame bar, means to rotate said rockshaft, means interconnecting said rockshaft and said rear furrow wheel whereby said rotation of said rockshaft will cause the rear furrow wheel to be moved generally vertically, and means cooperable with said rockshaft to move the front furrow wheel generally vertically.

6. In combination, a tractor having a pair of rearwardly extending draft links, said tractor having hydraulic power means controllable from the tractor for raising and lowering said draft links, a semi-mounted earth-working implement having a front crossbeam connectible to said draft links, an implement frame including a main frame bar extending obliquely to the direction in which the implement is adapted to be pulled and a forwardly extending hitch bar having a rear end portion nonrotatably secured to the main frame bar and having a front end portion secured to said crossbeam, a plurality of earth-working tools mounted on said main frame bar, a rear ground-engaging furrow wheel, means for mounting said wheel on the rear end of said main frame bar whereby it can be raised and lowered with respect to the rear end of the frame, a forward ground-engaging furrow wheel, means for mounting said wheel on the forward end of said main frame bar whereby it can be raised and lowered with respect to the forward end of the frame, first and second power transmitting means controllable from said tractor operably interconnecting said tractor power means and said rear and forward furrow wheels respectively for raising and lowering the same, the front end of said hitch bar being vertically adjustable from the tractor independently of the rear and forward ends of the main frame bar by raising and lowering of said draft links, the rear end of the main frame bar being vertically adjustable from the tractor independently of the front end of the hitch bar and the forward end of the main frame bar by raising and lowering said rear furrow wheel through operation of said first power transmitting means, and the forward end of the main frame bar being vertically adjustable from the tractor independently of the front end of the hitch bar and the rear end of the main frame bar by raising and lowering said forward furrow wheel through operation of said second power transmitting means.

7. In an agricultural apparatus including a tractor having a pair of draft links adapted to be raised and lowered by power, the combination therewith of a plow comprising a main frame bar extending obliquely to the direction in which the plow is adapted to be pulled, a plurality of depending earth-working tools mounted on said main frame bar, a forwardly extending hitch bar nonrotatably attached to a midportion of the main frame bar, forward and rear furrow wheels mounted on forward and rear portions of the main frame bar, respectively, a transversely extending crossbeam, and means for connecting a midportion of said crossbeam in fixed spaced relation to the forward end of said hitch bar to rotate about a generally vertically extending axis and a generally fore-and-aft extending axis, the outer ends of said crossbeam being interconnected with rear ends of the draft links of the tractor.

8. The invention set forth in claim 7 in which said means connecting the crossbeam with the hitch bar comprises a vertically extending sleeve secured to the forward end of the hitch bar, a shaft journaled within said sleeve, a member rigidly secured to one end of said shaft, and a fore-and-aft extending pin carried by said member, the crossbeam being journalled about said pin.

References Cited by the Examiner

UNITED STATES PATENTS

| 820,057 | 5/1906 | Lundin | 172—421 X |
| 1,018,252 | 2/1912 | McLaren | 172—314 X |
| 1,590,582 | 6/1926 | Johnson et al. | 280—492 |
| 2,465,641 | 3/1949 | Gardner. | |
| 2,867,452 | 1/1959 | Ricklick | 280—492 |
| 2,979,140 | 4/1961 | McKenzie | 172—413 X |
| 2,985,246 | 5/1961 | Lundin | 172—421 X |
| 3,039,540 | 6/1962 | Ward | 172—396 X |
| 3,061,020 | 10/1962 | Mannheim | 172—417 X |

FOREIGN PATENTS

| 166,675 | 1/1956 | Australia. |

ABRAHAM G. STONE, *Primary Examiner.*

T. GRAHAM CRAVER, *Examiner,*